(12) United States Patent
Ikeda

(10) Patent No.: US 9,180,377 B2
(45) Date of Patent: *Nov. 10, 2015

(54) SYSTEM, PROGRAM, AND METHOD FOR GENERATING IMAGE OF VIRTUAL SPACE

(71) Applicant: DeNA Co., Ltd., Tokyo (JP)

(72) Inventor: Ryuji Ikeda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 14/080,633

(22) Filed: Nov. 14, 2013

(65) Prior Publication Data

US 2015/0119140 A1   Apr. 30, 2015

(30) Foreign Application Priority Data

Oct. 24, 2013 (JP) ................................. 2013-221029

(51) Int. Cl.
*A63F 13/5372* (2014.01)
*A63F 13/55* (2014.01)
*A63F 13/5258* (2014.01)

(52) U.S. Cl.
CPC .......... *A63F 13/5372* (2014.09); *A63F 13/5258* (2014.09); *A63F 13/55* (2014.09)

(58) Field of Classification Search
CPC . A63F 13/00; A63F 13/06; A63F 2300/6661; A63F 2300/6669; A63F 2300/6684; A63F 13/525; A63F 13/5252; A63F 13/5258; A63F 13/5372; A63F 13/55
See application file for complete search history.

(56) References Cited

U.S. PATENT DOCUMENTS

| 7,824,265 | B2 | 11/2010 | Kobayashi ...................... 463/33 |
| 2002/0142834 | A1* | 10/2002 | Sobue .............................. 463/30 |
| 2004/0259634 | A1 | 12/2004 | Machida |
| 2006/0252540 | A1 | 11/2006 | Kando et al. |

(Continued)

FOREIGN PATENT DOCUMENTS

| JP | 2004-267247 | 9/2004 |
| JP | 2008-212208 | 9/2008 |
| JP | 2010-068882 | 4/2010 |

OTHER PUBLICATIONS

Japanese Office Action in connection with Japanese Patent Application No. 2013-221029 mailed on Dec. 17, 2013 and English translation.

(Continued)

*Primary Examiner* — Jasson Yoo
(74) *Attorney, Agent, or Firm* — Pillsbury Winthrop Shaw Pittman LLP

(57) ABSTRACT

A computer program according to an embodiment of the present invention comprises: a grouping module configured to group the plurality of objects into a plurality of groups; a reference point determination module configured to determine a reference point and a group fixation point in the virtual space for each of the plurality of groups; a viewpoint control module configured to control positions of the viewpoint and the fixation point in the virtual space; and a display control module configured to display, on the display device, the view of the virtual space as viewed from the viewpoint toward the fixation point. While events are generated in the particular group among the plurality of groups, the viewpoint control module according to an embodiment of the present invention fixes the viewpoint at the reference point of the particular group and the fixation point at a group fixation point of the particular group.

9 Claims, 8 Drawing Sheets

(56) References Cited

U.S. PATENT DOCUMENTS

| | | | |
|---|---|---|---|
| 2008/0207324 A1 | 8/2008 | Hiroshige et al. | 463/33 |
| 2010/0069152 A1* | 3/2010 | Nishimura et al. | 463/31 |
| 2013/0244740 A1 | 9/2013 | Shimamura et al. | |
| 2015/0031450 A1* | 1/2015 | Matsuura | 463/31 |
| 2015/0116328 A1 | 4/2015 | Ikeda | |

OTHER PUBLICATIONS

Japanese Office Action in connection with Japanese Patent Application No. 2013-221029 issued on Apr. 30, 2014 and English translation.

"Decisive Battle II," "Dengeki PlatStation vol. 174," MediaWorks, Inc., Apr. 13, 2001, vol. 7, No. 11, pp. 64-67.

Statement of Certificate of Exception to Lack of Novelty for Japanese Patent Application No. 2013-221029 dated Nov. 1, 2013.

Statement of Certificate of Exception to Lack of Novelty for Japanese Patent Application No. 2013-221028 dated Nov. 1, 2013.

Japanese Office Action as issued in Japanese Patent Application No. 2013-221028, dated Dec. 17, 2013.

Japanese Office Action as issued in Japanese Patent Application No. 2013-221028, dated Apr. 30, 2014.

Non-Final Office Action as issued in U.S. Appl. No. 14/079,588, dated Aug. 27, 2015.

* cited by examiner

SYSTEM, PROGRAM, AND METHOD FOR GENERATING IMAGE OF VIRTUAL SPACE

CROSS-REFERENCE TO RELATED APPLICATIONS

This application is based on and claims the benefit of priority from Japanese Patent Application Serial No. 2013-221029 (filed on Oct. 24, 2013), the contents of which are hereby incorporated by reference in their entirety.

TECHNICAL FIELD

The disclosure herein relates to a system, program, and method for generating a view of a virtual space and, in particular, to a system, program, and method for displaying, on a display device, a view of a virtual space containing a plurality of objects.

BACKGROUND

It has been conventional in the field of video games and virtual reality to generate a view of a three-dimensional virtual space for display on a client terminal such as a smartphone and a game console. Ordinarily, a virtual space contains various objects including objects of a player character. A virtual space is generated based on various parameters such as parameters related to visual representation of the objects, parameters related to visual representation of a field or ground on which the objects are arranged, and parameters related to display position of the objects in the field.

A view of a virtual space is a visual representation of the virtual space as viewed from a virtual viewpoint (also referred to as "a virtual camera") in the virtual space toward a fixation point. A user can interact with the virtual space through a view of the virtual space displayed on the display device. For example, a user can operate a user character in the virtual space to generate an event in the virtual space.

The view of the virtual space changes at any time in accordance with the movement of the viewpoint. For example, in some video games (e.g., first person shooting games), the viewpoint moves to follow the movement of a player character in the virtual space, and views corresponding to the positions of the viewpoint are generated. In video games having a virtual space containing a plurality of objects (e.g., strategic simulation games), the viewpoint moves sequentially to the positions of the objects generating events (movement, attack, use of an item, etc.) to display the events generated by the objects; and views corresponding to the positions of the viewpoint are generated.

However, when the viewpoint follows an object moving fast or when a plurality of objects generate events within a short time, the display screen changes fast or frequently in accordance with the position of the viewpoint and users watching the view sometimes feel uncomfortable. Such uncomfortable feeling is also called camera sickness. Since camera sickness may reduce the satisfaction of users, it is required to improve the control of how a viewpoint moves in a virtual space.

To relieve the camera sickness, Japanese Patent Application Publication No. 2008-212208 (Patent Literature 1) proposes that time and speed for a viewpoint to move in parallel is limited and, when the limit is exceeded, the parallel movement is cut short.

RELEVANT REFERENCES

List of Relevant Patent Literature

Patent Literature 1: Japanese Patent Application Publication No. 2008-212208

SUMMARY

When a parallel movement of a viewpoint is cut short, the rapid change of a display screen caused by fast movement of the viewpoint can be restrained to some degree, but the camera sickness caused by the frequent movement of the viewpoint is not solved. As described above, when the virtual space contains a large number of objects (e.g., a virtual space of a strategic simulation game), the viewpoint tends to move frequently, causing camera sickness.

An object of the present invention is to relieve or reduce at least a part of the above problem. One object of the present invention is to restrict the movement of the viewpoint during generated events in a system, program, and method for displaying, on a display device, a view of a virtual space containing a plurality of objects. The other objects of the present disclosure will be apparent with reference to the entire description in this specification.

One embodiment of the present invention relates to a system comprising one or more computer processors for executing a given computer program to display a view of a virtual space containing a plurality of objects on a display device. A computer program according to an embodiment of the present invention comprises: a grouping module configured to group the plurality of objects into a plurality of groups; a reference point determination module configured to determine a reference point and a group fixation point in the virtual space for each of the plurality of groups; a viewpoint control module configured to control positions of the viewpoint and the fixation point in the virtual space; and a display control module configured to display, on the display device, the view of the virtual space as viewed from the viewpoint toward the fixation point, While events are generated in the particular group among the plurality of groups, the viewpoint control module according to an embodiment of the present invention fixes the viewpoint at the reference point of the particular group and the fixation point at a group fixation point of the particular group.

In this embodiment, while events are generated in the particular group, the viewpoint is fixed at a reference point of the group, and the fixation point is fixed at a group fixation point of the group. Therefore, while events are generated in the group, the view of the virtual space is a view from the viewpoint fixed at the reference point of the group toward the group fixation point of the group. Accordingly, the movement of the viewpoint and the fixation point can be restricted during the events generated in the group. Thus, the view of the virtual space is stabilized during the events.

As may be obviously understood from the description herein, a system according to an embodiment of the present invention comprises one or more computer processors for executing the modules described above and/or below, thereby to function as: a grouping unit configured to group the plurality of objects into a plurality of groups; a reference point determination unit configured to determine a reference point and a group fixation point in the virtual space for each of the plurality of groups; a viewpoint control unit configured to control positions of the viewpoint and the fixation point in the virtual space; and a display control unit configured to display, on the display device, the view of the virtual space as viewed from the viewpoint toward the fixation point, units configured to perform other various processes described herein.

The virtual space according to an embodiment of the present invention is a game space related to a battle game performing battles between a plurality of objects. In this battle game, player objects operated by the player and non-player objects operated by the computer are arranged in a field of the virtual space, and battles are performed between the player objects and the non-player objects.

In such a battle game (e.g., strategic simulation game), a large number of player objects and non-player objects generate various events such as an attack, use of items, and exercise of special effects. Even when a large number of events are generated in a particular group, the view displayed during the events shows the virtual space viewed from the viewpoint fixed at the reference point of the group toward the fixation point fixed at the group fixation point of the group.

In an embodiment of the present invention, the events in the particular group are generated by one or more event generation objects included in the particular group among the plurality of objects. The grouping module according to an embodiment of the present invention is configured to group the plurality of objects such that the objects subjected to the events generated by the one or more event generation objects are included in the particular group.

For example, suppose an attack event corresponding to an attack by an event generation object included in a first group among the plurality of groups on another object in a battle game in the present invention; the objects subjected to the attack (attacked objects) are grouped in the first group. In this embodiment, the event generation objects that generate an event and the objects subjected to the event are included in the same group; therefore, objects involved in an event are included in one group.

The computer program according to an embodiment of the present invention further comprises an event generation module configured to cause each of the one or more event generation objects included in the particular group to generate an event when the viewpoint has been moved to the reference point of the particular group and/or when the fixation point has been moved to the group fixation point of the particular group. Thus, the movement of the viewpoint and/or the fixation point to the particular group can be synchronized with generation of events in the particular group.

When all of the one or more event generation objects included in the particular group have generated a corresponding event, the viewpoint control module according to an embodiment of the present invention moves the viewpoint to the reference point of a second group different from the particular group among the plurality of groups and moves the fixation point to the group fixation point of the second group. Thus, after all the events of the particular group have been generated, the viewpoint and the fixation point are moved to respective positions corresponding to another group. Therefore, leaving of the viewpoint and/or the fixation point from the particular group can be synchronized with generation of the events in the particular group.

The reference point determination module according to an embodiment of the present invention sets a group fixation point of a group at the centroid of the objects included in the group. When the fixation point is moved to thus determined group fixation point, all the objects included in the group can be readily included in a view of the virtual space displayed on the display device. The reference point determination module according to an embodiment of the present invention may adjust as necessary the field angle of the viewpoint such that all the objects included in the particular group are included in a view of the virtual space.

The event generation module according to an embodiment of the present invention causes the one or more event generation objects to generate the events in an order determined based on a particular characteristic assigned to each of the one or more event generation objects included in the particular group. In an embodiment of the present invention, the predetermined characteristics may indicate agility assigned to each of the objects.

A method according to an embodiment of the present invention is a method for displaying on a display device a view of the virtual space containing a plurality of objects, the method comprising the steps of: grouping the plurality of objects into a plurality of groups; determining a reference point and a group fixation point in the virtual space for each of the plurality of groups; controlling positions of the viewpoint and the fixation point in the virtual space; and displaying, on the display device, the view of the virtual space as viewed from the viewpoint toward the fixation point. In an embodiment of the present invention, while events are generated in the group, the viewpoint is fixed at the reference point of the particular group, and the fixation point is fixed at a group fixation point of the particular group.

Various embodiments of the present invention restrict movement of the viewpoint during events in a system, generation program, and generation method for displaying, on a display device, a view of a virtual space containing a plurality of objects.

DESCRIPTION OF EXAMPLE EMBODIMENTS

Figure 1:
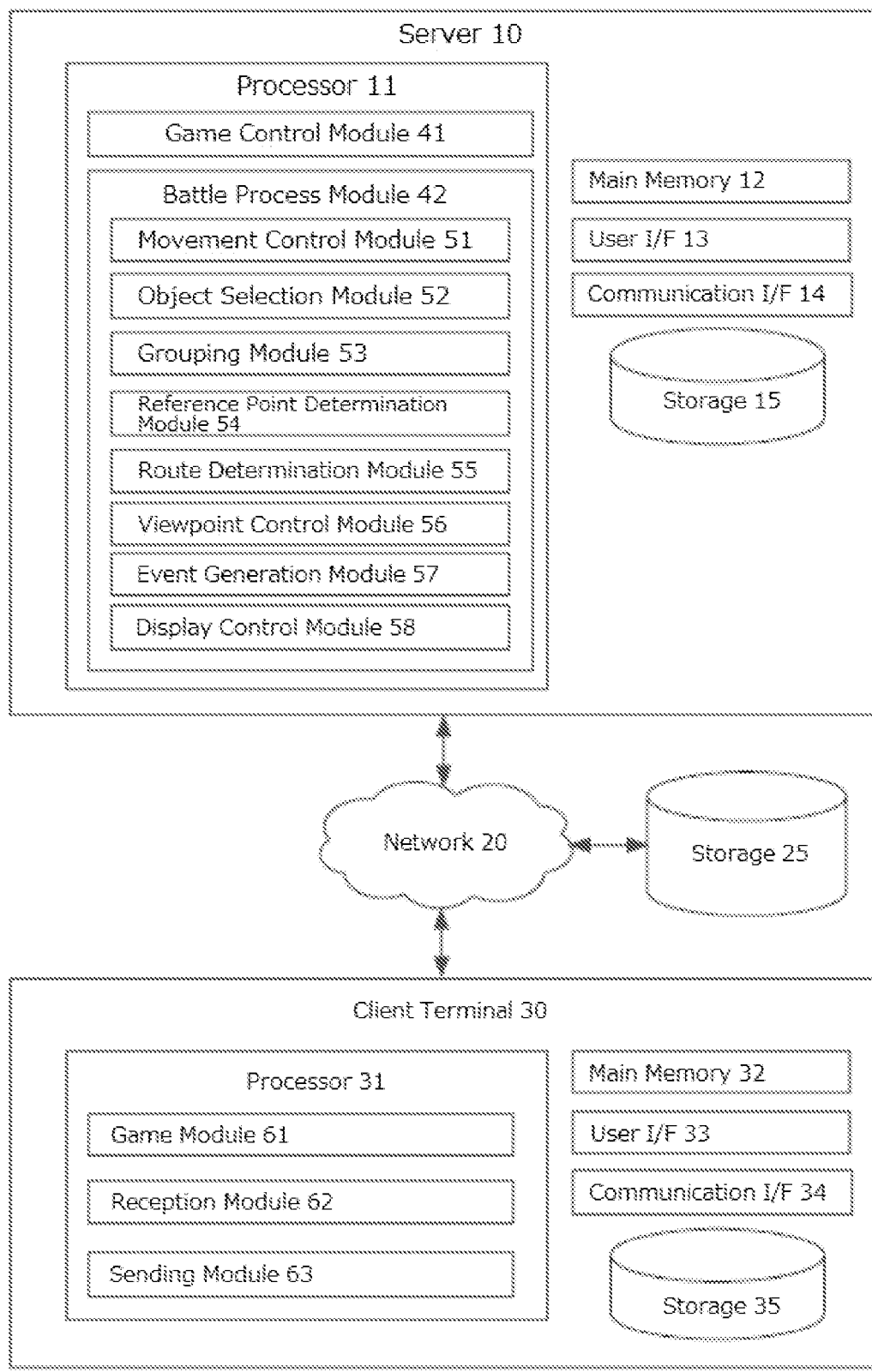
FIG. 1 is a block diagram schematically illustrating a system according to an embodiment of the present invention.

FIG. 1 is a block diagram schematically illustrating a system according to an embodiment of the present invention. The system according to an embodiment of the present invention may be configured to generate a view of a virtual space containing a plurality of objects.

As shown, the system according to an embodiment of the present invention may comprise a server 10 and a client terminal 30. In the embodiment shown in FIG. 1, the server 10 may cooperate with the functions of the client terminal 30 to provide an online battle game to the user of the client terminal 30. In the battle game, a battle may be performed between a plurality of player objects operated by the player and a plurality of non-player objects operated by the computer. In this embodiment, a view of a virtual space of the battle game may be displayed on the display of the client terminal 30. The embodiment shown in FIG. 1 wherein a view of a virtual space of the online battle game is generated is merely one embodiment of the present invention. It should be noted that the present invention can be applied to various virtual spaces containing a plurality of objects.

In the embodiment shown in FIG. 1, the server 10 may be communicatively connected to the client terminal 30 via a network 20 such as the Internet and provide the client terminal 30 with online game services (such as services related to online battle games). For example, the server 10 may process a game message (e.g., a message related to operations of a player object (or a player character) or a message that a quest has been started) received from the client terminal 30 in accordance with a predetermined game logic (or a program for implementing the game logic), and send a result of the process to the client terminal 30. The server 10 may also provide various game data required for progress of the games to the client terminal 30. As will be described later, the server 10 may provide the client terminal 30 with a view of a virtual space related to the game performed on the client terminal 30 (or battle log information and viewpoint information used to generate the view). The battle log information and the viewpoint information will be described in detail later. Although FIG. 1 shows only one client terminal 30, the server 10 may be communicatively connected to a plurality of client terminals 30.

As shown, the server 10 may include a processor 11, a main memory 12, a user I/F 13, a communication I/F 14, and a storage 15. These components may be electrically connected to each other via a bus not shown. The processor 11 may load an operating system and various programs for implementing the game logic into the main memory 12 from the storage 15, and may execute commands included in the loaded programs. The main memory 12 may be used to store a program to be executed by the processor 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the processor 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the client terminal 30 via the network 20.

The storage 15 may be formed of, for example, a magnetic disk drive and store various programs such as a game control program for implementing the game logic. The storage 15 may also store various data used in the game. The various data that may be stored in the storage 15 may also be stored on a database server communicatively connected to the server 10 and physically separate from the server 10.

In an embodiment, the server 10 may be a web server for managing a web site including a plurality of hierarchical web pages. The client terminal 30 may fetch HTML data for rendering these web pages from the server 10 and analyze the fetched HTML data to render a game screen on a display of the client terminal 30. A player may provide various inputs to the client terminal 30 via the game screen thereby to interact with a game provided by the server 10 (e.g., the player may operate a player object with instructions or select a menu). The storage 15 may store the HTML data for rendering the web page. The HTML data may be composed of HTML code written in a markup language such as HTML. The HTML code may be associated with various images. Additionally, the HTML data may include programs written in script languages such as ActionScript™ and JavaScript™.

Thus, the server 10 may manage the web site for providing game services and deliver web pages constituting the web site in response to a request from the client terminal 30, thereby progressing the game. A game provided through such a web page is sometimes called a browser game.

In another embodiment of the present invention, a game application program may be executed on the client terminal 30 in an execution environment such as an OS or middleware, such that the game application program and the server 10 may cooperate with each other to provide a game. The game application program may be stored on, e.g., a storage 15 or a storage 25 and downloaded onto the client terminal 30 in response to a request from the client terminal 30. The game application programs may include, on execution on the client terminal 30, instruction sets for processing game data provided by the server 10 and various data such as image data referred to when the instruction sets are executed. The game application programs may be created in, for example, object oriented languages such as Objective-C™ and Java™. The game application programs may be stored on the storage 15, the external storage 25, or other storages not shown.

In response to a delivery request from the client terminal 30, the game application programs stored on a storage such as the storage 15 may be delivered to the client terminal 30. The delivered game application programs may be received by the client terminal 30 via a communication I/F 34 under the control by the processor 31. The received game application programs may be stored on, e.g., the storage 35. The application software may be launched in accordance with the player's operation on the client device 30 and may be executed on a platform, such as an OS or middleware, implemented on the client device 30.

The server 10 may process messages from the game application programs in accordance with a predetermined game logic and return various information indicating a result of the processing to the game application program, thereby to control the progress of the game. In the embodiment shown in FIG. 1, the server 10 may have a function of processing, in accordance with a predetermined battle logic, a battle between a player object operated by a player and a non-player object operated by a computer in accordance with a predetermined logic.

The game application programs executed on the client terminal 30 may receive, from the server 10, battle log information indicating the contents of the battle process. The battle log information will be described in detail later. The game application program may generate a view of the virtual space based on the viewpoint information indicating the position of the viewpoint in the virtual space (described later) and the battle log information received from the server, and display the generated view (game screen) on the display of the client terminal 30. The player can progress the game while watching the game screen displayed on the display of the client terminal 30.

Thus, the game application programs are executed on the client terminal 30 such that the functions of the game application programs and the functions of the server 10 cooperate with each other to progress the game. A game provided through such game application programs is sometimes called an application game. The present invention can be applied to both browser games and application games.

The server 10 may also include a function to authenticate a player at start of the game and perform charging process in accordance with progression of the game. The games provided by the server 10 may include desired games having a virtual space containing a plurality of objects, such as action games, role playing games, and baseball games. The types of the games implemented by the server 10 and the client terminal 30 (or the game application programs executed on the client terminal 30) are not limited to those explicitly described herein.

Next, client terminal 30 will be described below. The client terminal 30 according to an embodiment of the present invention may be a desired information processing device including at least one of an environment for rendering web pages of a game web site fetched from the server 10 on a web browser and an application execution environment for executing game application programs. Non-limiting examples of the client terminal 30 may include mobile phones, smartphones, tablet terminals, personal computers, electronic book readers, and game consoles.

As shown, the client terminal 30 according to an embodiment of the present invention may include a processor 31, a main memory 32, a user interface (I/F) 33, a communication I/F 34, and a storage 35, and these components may be electrically connected to one another via a bus 36.

The processor 31 may load various programs such as an operating system into the main memory 32 from the storage 35, and may execute commands included in the loaded programs. The main memory 32 may be used to store a program to be executed by the processor 31, and may be formed of, for example, a dynamic random access memory (DRAM).

The user I/F 33 may include an information input device for receiving inputs from the player and an information output device for outputting an operation result of the processor 31; and the user I/F 33 may include a display device such as a liquid crystal display having a touch screen. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the network 20.

The storage 35 may comprise, for example, a magnetic disk drive or a flash memory and store various programs such as an operating system. When receiving a game application program from the server 10 via the communication I/F 34, the storage 35 may store the received game application program.

The client terminal 30 may include, for example, browser software for interpreting an HTML file (HTML data) and rendering a screen; this browser software may enable the terminal device 30 to interpret the HTML data fetched from the server 10 and render web pages corresponding to the received HTML data. Further, the client terminal 30 may include plug-in software (e.g., Flash Player distributed by Adobe Systems Incorporated) embedded into browser software; therefore, the terminal device 30 can fetch from the server 10 a SWF file embedded in HTML data and execute the SWF file by using the browser software and the plug-in software.

In the client terminal 30, the game application program may be launched in accordance with the operation by the player and executed on a platform implemented on the client terminal 30. When a game application program is executed on the client terminal 30, for example, animation or an operation icon designated by the program may be displayed on a screen of the client terminal 30. The player may enter an instruction for progressing the game through the user I/F 33 of the client terminal 30.

The processor 11 of the server 10 and the processor 31 of the client terminal 30 according to an embodiment of the present invention may execute various computer program modules. The computer program modules executed in the server 10 and the client terminal 30 and other computer program modules as required may implement the function of the system of the present invention that may display a view of a virtual space containing a plurality of objects on a display device.

As shown, the computer program modules executed by the processor 11 of the server 10 may include a game control module 41 and a battle process module 42. Meanwhile, the computer program modules executed by the processor 31 of the client terminal 30 may include game module 61 for displaying a view of a virtual space on the display of the client terminal, a reception module 62 for receiving various instructions from the user of the client terminal 30, and a sending module 63 for sending to the server 10 a message indicating various instructions from the player received by the reception module 62.

A part or all of the modules provided to the server 10 shown in FIG. 1 may also be executed by the processor 31 of the client terminal 30 or a processor of other devices; and a part or all of the modules provided to the client terminal 30 may also be executed by the processor 11 of the server 10 or a processor of other devices. For a standalone game wherein a virtual space is provided by the client terminal 30 executing the application programs without communication with the server 10, the system of the present invention may be configured such that a part or all of the modules illustrated in FIG. 1 to be executed on the server 10 are executed on the client terminal.

The modules executed on the server 10 will be further described below. For example, the game control module 41 according to an embodiment of the present invention may process a game message from the client terminal 30 in accordance with predetermined game logic and provide various game data for executing the battle game to the client terminal 30, thereby to control the progress of the game. For example, when receiving from the client terminal 30 an item use message for instructing a player object to use an item, the game control module 41 may perform a process of causing the player object to use the designated item, and may provide item use information indicating the result (e.g., recovery of life) to the client terminal 30. The game data provided by the game control module 41 may include, for example, object data related to the player objects and the non-player objects and quest data related to the quest experienced by the player. Also, the game control module 41 may provide a chat function and a messaging function to encourage communication between players.

The battle process module 42 according to an embodiment of the present invention may perform a battle process between a player object and a non-player object in accordance with predetermined battle logic. The battle process may include, for example, a battle between a plurality of player objects controlled based on instructions from the player and a plurality of non-player objects controlled based on predetermined logic independently of the instructions from the player. In an embodiment, the game is a turn-based game, wherein each player object performs various actions such as movement and attack during a turn of the player, followed by each non-player object performing the same various actions during a turn of the computer.

As shown in FIG. 1, the battle process module 42 may comprise a movement control module 51, an object selection module 52, a grouping module 53, a reference point determination module 54, a route determination module 55, a viewpoint control module 56, an event generation module 57, and a display control module 58. These modules will be described below.

The movement control module 51 according to an embodiment of the present invention may control movement of a plurality of objects arranged in a virtual space (game space) within the virtual space. For example, the movement control module 51 may determine the position to which an object moves in a turn, based on a game message received from the client terminal 30 for instructing a player object to move and predetermined logic related to movement of objects. For example, each object may have its movement range assigned thereto and may be controlled to move to a position within the movement range.

The object selection module 52 according to an embodiment of the present invention may select one or more event generation objects satisfying a predetermined event generation condition in each turn. In the embodiment, the events may be related to battle games and may include, for example, attack events, item events, special effect events, and conversation events. For example, each of the plurality of objects may have its attack range assigned thereto within which to attack other objects; and when an object is within the attack range of another object, it may be determined that the predetermined event generation condition is satisfied for the other object. In an embodiment, it may be determined whether an object is within the attack range based on the position of the object having been moved by the movement control module 51. The events specifically described herein are mere examples; events of the present invention may include any events generated in relation to one or more objects in a virtual space. The event generation condition for an object is not limited to those related to the above event generation area.

The grouping module 53 according to an embodiment of the present invention may group a plurality of objects in a virtual space into a plurality of groups in each turn. For example, the grouping module 53 may group a plurality of objects in a virtual space in each turn such that one or more event generation objects selected by the object selection module 52 may be in the same group as the objects for which the one or more event generation objects generate events. For example, in the case where the above event is an attack event corresponding to an attack by one object on another object in a battle game, the one object, having an attack range assigned thereto within which to attack in the virtual space, and other objects present within the attack range (objects to be attacked by the one object) may be grouped in a same group. When a plurality of event generation objects are in the virtual space, the above grouping process may be performed for each of the plurality of event generation objects in the order determined based on a particular characteristic of the plurality of event generation objects. For example, the particular characteristic of the objects may indicate agility of the object. The grouping may also be performed by the grouping module 53 not in each turn but at a predetermined timing in or after starting of a game (e.g., a timing determined by an instruction from the player). The groups established at starting of a game or a predetermined timing may be either updated at starting of a new turn or retained even after starting of a new turn.

The grouping of objects according to the present invention will now be described with reference to FIGS. 2 to 6. FIGS. 2 to 6 schematically illustrate objects included in a virtual space and is referred to for description of the grouping in an embodiment of the present invention. The virtual space shown in FIGS. 2 to 6 have a field divided into squares; and in the squares may be arranged the objects 86A to 86C representing player characters operated by the player (hereinafter referred to simply as "player objects 86A to 86C") and the objects 88A and 88B representing non-player characters operated by the computer in accordance with predetermined logic (hereinafter referred to simply as "non-player objects 88A and 88B"). For example, the movement control module 51 may determine the arrangement of the player objects 86A to 86C and the non-player objects 88A and 88B shown in FIGS. 2 to 6.

FIGS. 2 to 6 illustrate examples of grouping of a plurality of objects based on an attack event in the virtual space. In FIGS. 2 to 6, the arrows between objects indicate the direction of attack. More specifically, the example shown in FIG. 2 includes a bidirectional arrow between the player object 86A and the non-player object 88A, which may indicate that the player object 86A and the non-player object 88A may attack each other. Likewise, other arrows indicate the direction of attack; in the example shown in FIG. 2, the player objects 86B and 86C attack the non-player object 88B, and the non-player object 88B attacks the player object 86C.

Figure 2:
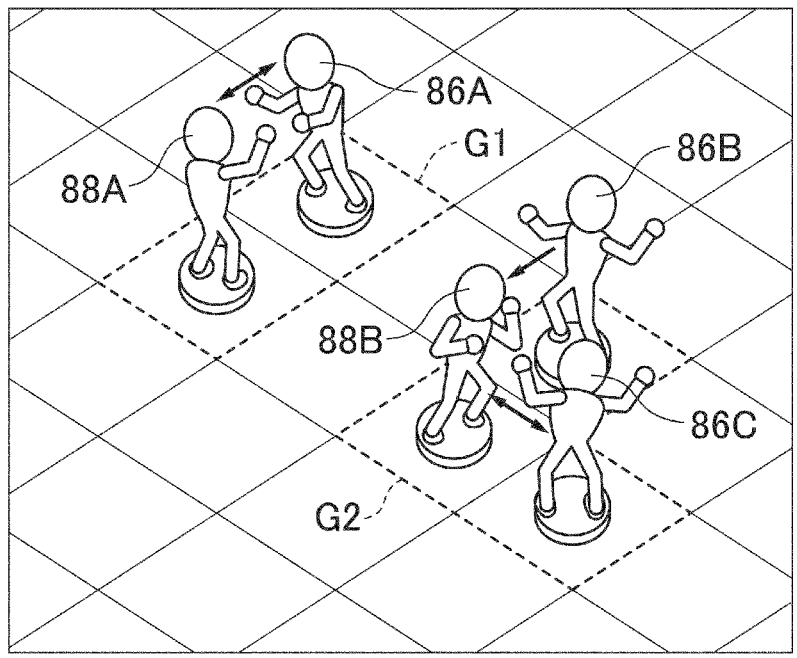
FIG. 2 schematically shows a grouping method in an embodiment of the present invention.

In the example shown in FIG. 2, the event generation condition for an attack event is that there is an object of the opposite camp in adjoining squares of the field. To the player objects, the opposite camp may refer to the non-player objects; and to non-player objects, the opposite camp may refer to the player objects. The object selection module 52 may determine whether the individual objects satisfy the event generation condition based on the positions of the objects in the field, and select objects satisfying the event generation condition as event generation objects. In the example shown in FIG. 2, each of the player objects 86A to 86C and the non-player objects 88A and 88B is placed in a square adjoining a square having one of the objects of the opposite camp placed therein; therefore, the object selection module 52 may select all of the player objects 86A to 86C and the non-player objects 88A and 88B as event generation objects.

In the example shown in FIG. 2, the grouping module 53 may group the player objects 86A to 86C and the non-player objects 88A and 88B selected as event generation objects such that an attacking object and an object attacked thereby (attacked object) are in a same group. More specifically, the player object 86A and the non-player object 88A attack each other as described above; and thus the player object 86A and the non-player object 88A are grouped into a group G1. The player objects 86B and 86C attack the non-player object 88B, and the non-player object 88B attacks the player object 86C; and thus the player objects 86B and 86C and the non-player objects 88B are grouped into a group G2.

Figure 3:
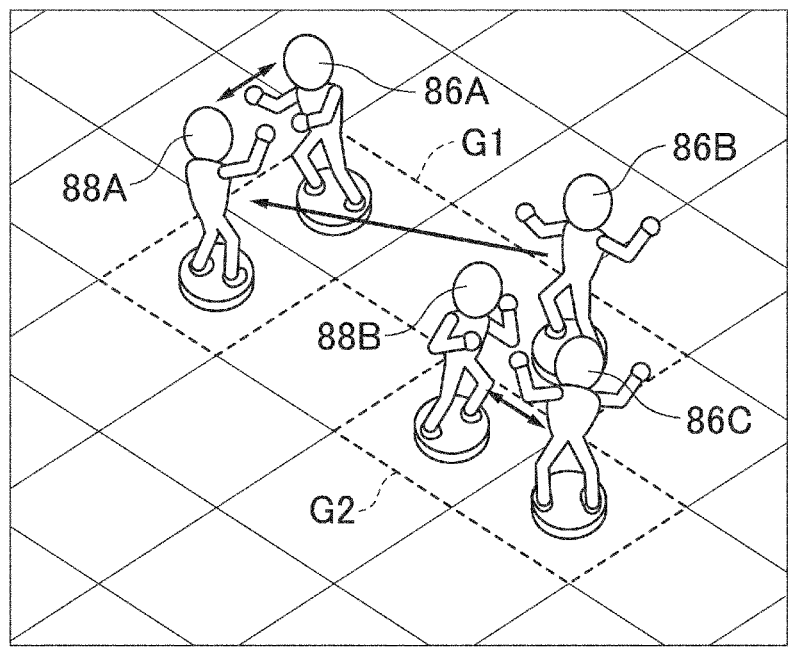
FIG. 3 schematically shows a grouping method in an embodiment of the present invention.

FIG. 3 shows another example of grouping. In FIG. 3, the event generation area of the player object 86B may be determined such that the player object 86B can attack an object in a square not adjoining the square of the player object 86B. The example shown in FIG. 3 is different from the example shown in FIG. 2 in that the player object 86B attacks the non-player object 88A distant from the player object 86B. In the example shown in FIG. 3, the player object 86B attacks the non-player object 88A; therefore, the player object 86B is grouped into the group G1.

Figure 4:
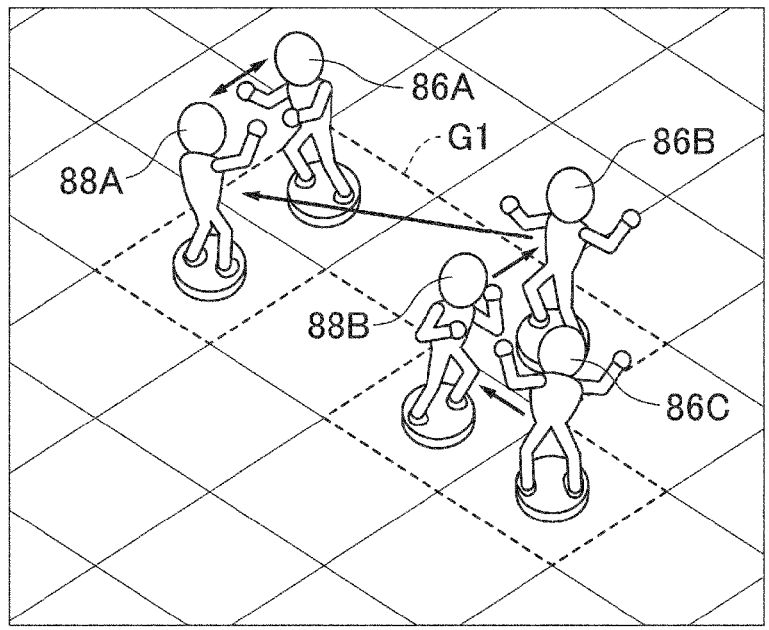
FIG. 4 schematically shows a grouping method in an embodiment of the present invention.

FIG. 4 shows still another example of grouping. The example shown in FIG. 4 is different from the example shown in FIG. 3 in that the non-player object 88B attacks the player object 86B instead of the player object 86C. The non-player object 88B, which attacks the player object 86B instead of the player object 86C, is grouped into the group G1. Also, the player object 86C, which attacks the non-player object 88B grouped into the group G1, is also grouped into the group G1. As a result, all of the five objects in the example shown in FIG. 4 are grouped into the group G1. The grouping process may be performed in the order determined by a particular characteristic such as agility of the event generation objects (the player objects 86A to 86C and the non-player objects 88A and 88B). For example, in the example shown in FIG. 4, if the agility of the objects decreases in the order of the player object 86A, the player object 86C, the non-player object 88A, the non-player object 88B, and the player object 86B, a grouping process may be started from the player object 86A having the highest agility. That is, the player object 86A and the non-player object 88A attacked by the player object 86A are grouped in a same group. Next, another grouping process may be started from the player object 86C having the second highest agility; and the player object 86C and the non-player object 88B attacked by the player object 86C are grouped in a same group. Next, still another grouping process may be started from the non-player object 88A having the third highest agility; and the non-player object 88A and the player object 86A attacked by the non-player object 88A are grouped in a same group. However, in the example shown in FIG. 4, the player object 86A and the non-player object 88A are already grouped in a same group by the grouping process started from the player object 86A; therefore, no group is newly formed in the grouping process started from the non-player object 88A. Likewise, a grouping process may be performed for all the event generation objects in the virtual space. In the examples other than shown in FIG. 4, a grouping process may also be likewise performed in the order of a particular characteristic of the event generation objects.

Figure 5:
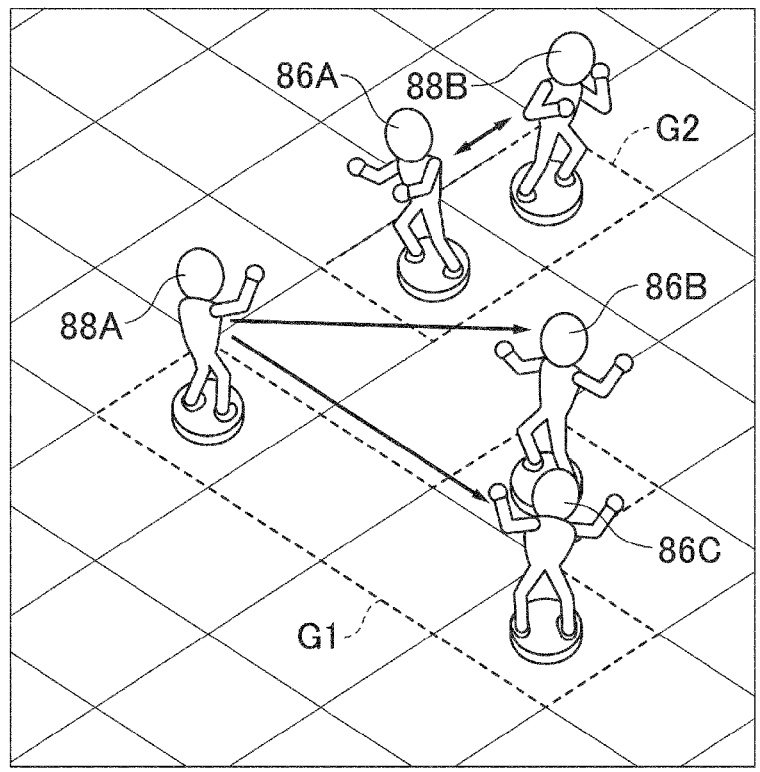
FIG. 5 schematically shows a grouping method in an embodiment of the present invention.

FIG. 5 shows still another example of grouping. In FIG. 5, the event generation area for the non-player object 88A may be determined such that the non-player object 88A can attack a plurality of objects (the player objects 86B and 86C) in squares not adjoining the square of the non-player object 88A. Since the non-player object 88A attacks the player objects 86B and 86C, the non-player object 88A and the player objects 86B and 86C are grouped in the group G1. Also, since the player object 86A and the non-player object 88B attack each other, the player object 86A and the non-player object 88B are grouped into the group G2. In another embodiment, it may be possible that the non-player object 88A can attack only one of the player objects 86B and 86C included in the event generation area of the non-player object 88A, and the attacked object (e.g., the player object 86B) and the non-player object 88A should be grouped in a same group while the player object 86C should be grouped in a different group.

Figure 6:
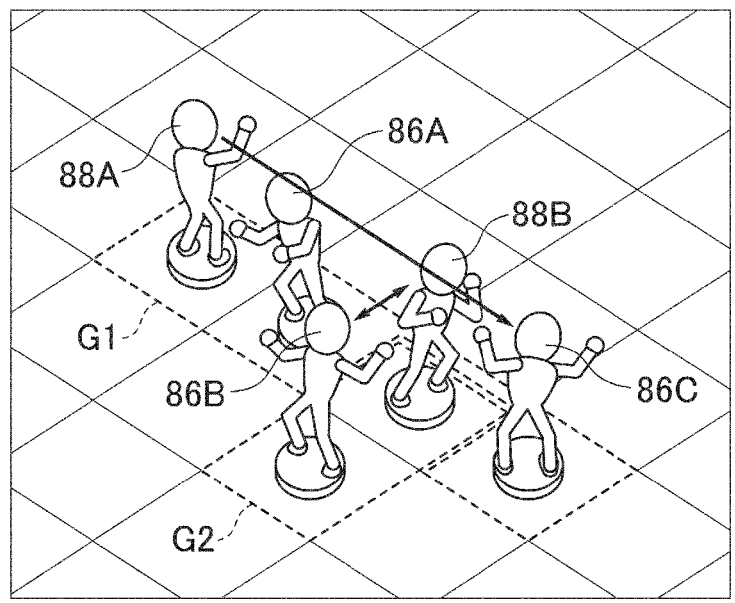
FIG. 6 schematically shows a grouping method in an embodiment of the present invention.

FIG. 6 shows still another example of grouping. In FIG. 6, the event generation area of the non-player object 88A may be determined such that the non-player object 88A can attack a plurality of objects arranged in a line (the player objects 86A and 86C). Thus, the non-player object 88A and the player objects 86A and 86C are grouped into the group G1. Although the non-player object 88B is also placed in the line across the player objects 86A and 86C, the non-player object 88B, which is in the same camp as the non-player object 88A, is not attacked by the non-player object 88A; therefore, the non-player object 88B is not grouped into the group G1. Meanwhile, since the player object 86B and the non-player object 88B attack each other, the player object 86B and the non-player object 88B are grouped into the group G2.

The grouping described with reference to FIGS. 3 to 6 are mere examples; and the present invention can employ any method of grouping such that an object generating an event (event generation object) and an object subjected to the event are grouped into a same group. The events employed for grouping are not limited to those described above and may include various events in the virtual space.

The reference point determination module 54 according to an embodiment of the present invention may determine a reference point and a group fixation point in the virtual space for each of the groups formed by the grouping module 53 in each turn. In an embodiment described later, when a viewpoint is at a reference point of a particular group, the fixation point of the viewpoint is positioned at the group fixation point of the particular group. In an embodiment, one reference point and one group fixation point may be determined for each group.

In an embodiment, the position corresponding to the centroid of a plurality of objects included in a group may be selected as the group fixation point. However, the group fixation point of the present invention is not limited to the centroid of the objects included in the group, and may be, for example, a position (e.g., the center) in a square in which one of the objects included in the group is placed or a position corresponding to the centroid of a plurality of player objects included in the group. For example, when a group includes an object corresponding to a commander in a battle game, the group fixation point may be at the position of the object corresponding to the commander. Thus, the group fixation point may be set at the position of an object noticeable to the player.

Figure 7:
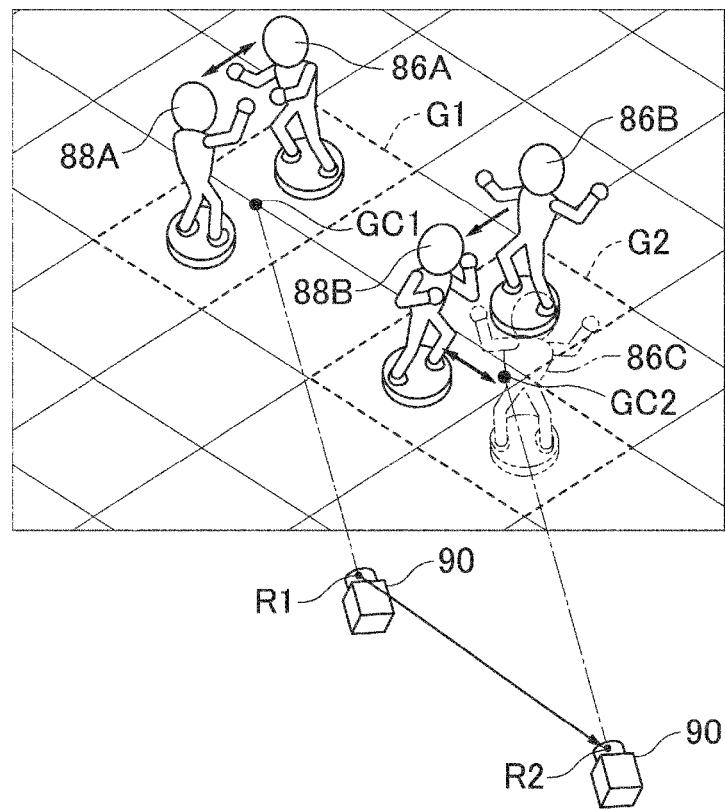
FIG. 7 schematically shows an arrangement of reference points in an embodiment of the present invention.

The position of a reference point in the virtual space will be further described with reference to FIG. 7. FIG. 7 schematically shows arrangement of reference points R1 and R2 in an embodiment of the present invention. As will be described later, a viewpoint (virtual camera) 90 may move to the reference points R1 and R2. The arrangement of the objects and the method of grouping in the virtual space shown in FIG. 7 are the same as those shown in FIG. 2. In FIG. 7, the group fixation point of the group G1 is set at the centroid GC1 of the player object 86A and the non-player object 88A included in the group G1; and the group fixation point of the group G2 is set at the centroid GC2 of the three objects: the player objects 86B and 86C and the non-player object 88B included in the group G2.

The coordinates indicating the position of the reference point of a particular group may be found by, for example, converting the coordinates indicating the position of the group fixation point of the same group. In the example shown in FIG. 7, the coordinates of the reference point R1 of the group G1 may be set in a particular direction and at a particular distance from the coordinates indicating the position of the group fixation point of the group G1 (the centroid GC1). Likewise, the coordinates of the reference point R2 of the group G2 may be set in a particular direction and at a particular distance from the coordinates indicating the position of the group fixation point of the group G2 (the centroid GC2). That is, the coordinates of the reference point of a group may be set in a particular direction (e.g., z-axis) and at a particular distance from the coordinates indicating the position of the group fixation point of the group. Various coordinate transformations may be employed to find the coordinates of a reference point from the coordinates of a group fixation point. Additionally, the coordinate transformations applied may be either the same for all the groups or different depending on the groups.

Figure 8:
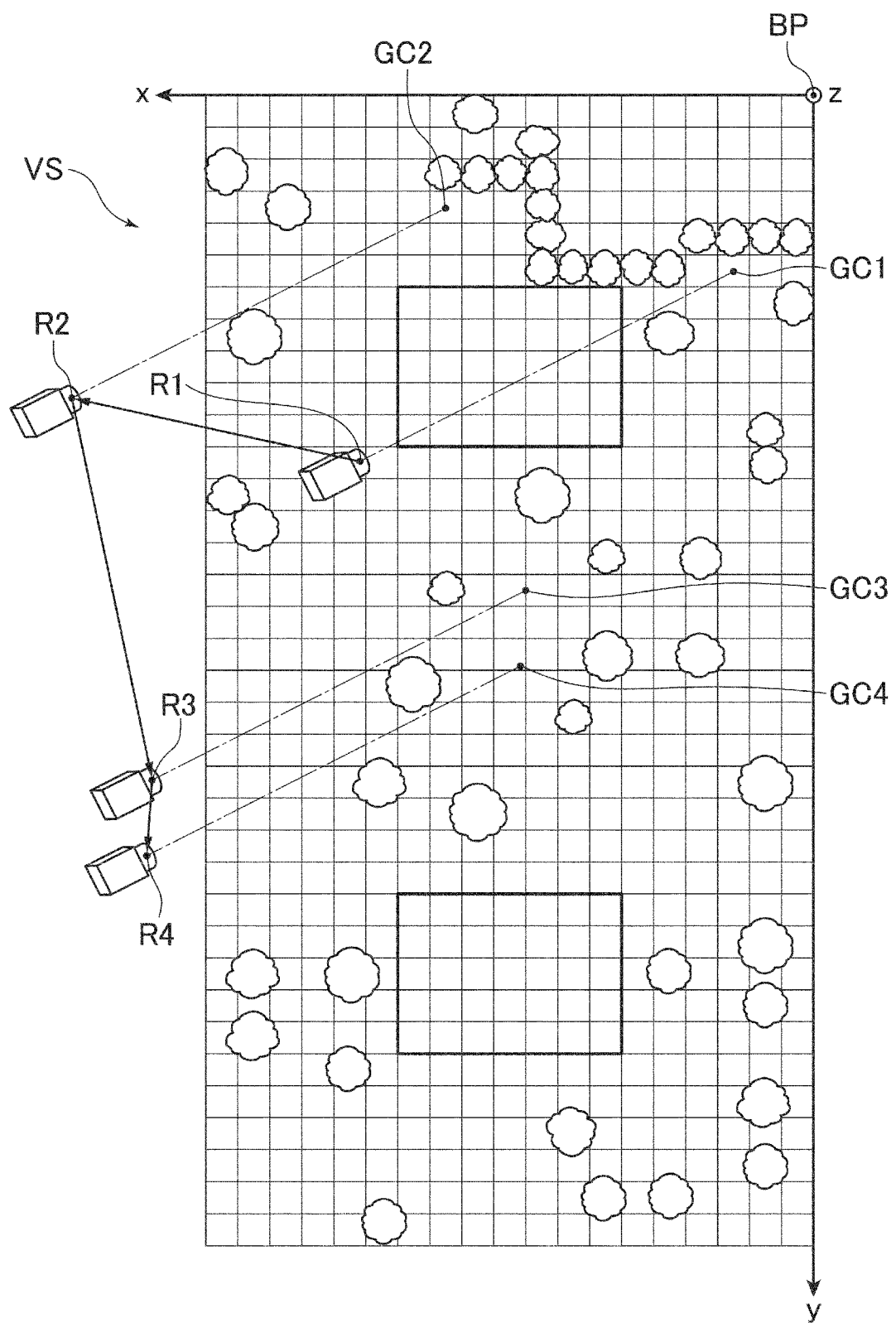
FIG. 8 schematically shows a moving route of a viewpoint in an embodiment of the present invention.

The route determination module 55 according to an embodiment of the present invention may determine, in each turn, a route that can be followed by the viewpoint 90 based on the reference points of the groups determined by the reference point determination module 54. In an embodiment, a route may be formed by connecting, in a predetermined order, the reference points of the groups determined by the reference point determination module 54. The route of a viewpoint will be further described with reference to FIG. 8. FIG. 8 schematically shows an entire virtual space in an embodiment of the present invention.

As shown in FIG. 8, a virtual space VS according to an embodiment of the present invention may include a two-dimensional field containing a plurality of objects (in FIG. 8, objects are hidden for simple illustration). As described above, the reference point determination module 54 may set the group fixation points at the centroids GR1 to GR4 of the objects for each group. In the example shown in FIG. 8, the reference points R1 to R4 are set in a particular direction and at a particular distance from the centroids GR1 to GR4, respectively.

As described above, the route determination module 55 may determine the route of the viewpoint 90 by connecting the reference points R1 to R4 in a predetermined order. In an embodiment, the "predetermined order" may be determined based on the positions of the reference points with respect to a particular base point BP in the virtual space VS. In an embodiment as shown in FIG. 8, the base point BP may be set at one of the corners of the rectangularly formed two-dimensional field of the virtual space VS. In an embodiment, the distances from the base point BP to the group fixation points GC1 to GC4 may be compared with each other; and the moving route of the viewpoint 90 may be determined in the ascending order of these distances. In the example shown in FIG. 8, the distance from the base point BP is longer in the order of the group fixation point GC1, the group fixation point GC2, the group fixation point GC3, and the group fixation point GC4; therefore, the route of the viewpoint 90 may be set via the reference point R1 corresponding to the group fixation point GC1, the reference point R2 corresponding to the group fixation point GC2, the reference point R3 corresponding to the group fixation point GC3, and the reference point R4 corresponding to the group fixation point GC4. In this case, the route determination module 55 may set the route of the viewpoint 90 on the route connecting the reference point R1, the reference point R2, the reference point R3, and the reference point R4 in this order.

The method of determining the route of the viewpoint 90 may be varied desirably. For example, the route determination module 55 may search for group fixation points in the virtual space along a predetermined search route starting from the base point BP, and connect reference points corresponding to group fixation points in the order of finding the group fixation points thereby to form the route of the viewpoint 90. For example, the search route for group fixation points may start from the base point BP and extend in parallel with the x-axis to the x-axis edge of the virtual space in the row where y=0, and continue to the row where y=1 extending likewise from the point where x=0 to the x-axis edge of the virtual space. The search may be continued with the value of y incremented by 1 until the y-axis edge of the virtual space is reached. The route of the viewpoint 90 may be formed by connecting the reference points corresponding to the group fixation points in the order of finding the group fixation points in the route. In the example shown in FIG. 8, this method of determining a route of the viewpoint 90 may form a route connecting the reference point R2, the reference point R1, the reference point R3, and the reference point R4 in this order. The method of determining the route of the viewpoint 90 applicable to the present invention is not limited to those explicitly described herein but may be various within the scope of the invention.

Alternatively, the route determination module 55 may determine the route of the viewpoint 90 independently of the base point BP. For example, the route determination module 55 may determine the order of the groups based on the characteristics of the objects (or event generation objects) included in the groups determined by the grouping module 53, and determine the order of the reference points of the groups in accordance with the order of the groups. For example, characteristic values indicating the agility of the objects may be averaged for each group to rank the groups in the descending order of the averaged values; and the viewpoint 90 may be moved via the reference points in the descending order of the ranking of the groups. Thus, the route of the viewpoint 90 may be determined based on the agility of the objects such that the viewpoint 90 may move first to the groups including objects with higher agility.

The viewpoint control module 56 according to an embodiment of the present invention may move the viewpoint 90 along the route determined by the route determination module 55. In the example shown in FIG. 8, the viewpoint control module 56 may move the viewpoint 90 along the route connecting the reference point R1, the reference point R2, the reference point R3, and the reference point R4 in this order. Also, in synchronization with the movement of the viewpoint, the fixation point may be moved along the route connecting the group fixation point GC1, the group fixation point GC2, the group fixation point GC3, and the group fixation point GC4 in this order. In an embodiment, the viewpoint 90 can move along the route determined by the route determination module 55 in only one direction (in the above example, the direction from the reference point R1 to the reference point R2, from the reference point R2 to the reference point R3, and from the reference point R3 to the reference point R4), but not in the reverse direction (from the reference point R2 to the reference point R1, from the reference point R3 to the reference point R2, and from the reference point R4 to the reference point R3).

In each turn, the event generation module 57 according to an embodiment of the present invention may generate, in accordance with predetermined game logic, various events such as an attack event and an item use event on each of one or more event generation objects included in the each of the groups generated by the grouping module 53. For example, in response to movement of the viewpoint 90 to a reference point of a particular group under control by the viewpoint control module 56, the event generation module 57 may cause an event generation object included in the particular group to generate an event.

Referring back to FIG. 2, how the event generation module 57 causes an event to be generated will now be described. As described above, events generated in the example shown in FIG. 2 may include an attack event on the non-player object 88A by the player object 86A, an attack event on the player object 86A by the non-player object 88A, an attack event on the non-player object 88B by the player objects 86B and 86C, and an attack event on the player object 86C by the non-player object 88B. In response to movement of the viewpoint 90 to the reference point of the group G1, the event generation module 57 may generate events of the player object 86A and the non-player object 88A included in the group G1. In an embodiment of the present invention, the attack events may be generated in the order determined based on predetermined characteristics assigned to each of the event generation objects. In an embodiment of the present invention, the predetermined characteristics may indicate agility assigned to each of the objects. When an attack event is generated, a result of the attack (e.g., damage imparted on the attacked object) may be calculated based on the characteristics of the attacking object (offense power, etc.) and the characteristics of the attacked object (defense power, etc.).

After the viewpoint 90 moves to the reference point of the group G1, the viewpoint control module 56 according to an embodiment of the present invention may fix the viewpoint 90 at the reference point of the group G1 during the events generated by the event generation objects included in the group G1 (i.e., the player object 86A and the non-player object 88A). The viewpoint control module 56 may move the viewpoint 90 to the reference point of the group G2 after all the event generation objects included in the group G1 have generated an event. Thus, the viewpoint 90 may be fixed at the reference point of the group G1 while the objects included in the group G1 generate events. When the viewpoint 90 is moved to the reference point of the group G2, the event generation module 57 may generate the events of the event generation objects included in the group G2 (the player objects 86B and 86C and the non-player object 88B). The viewpoint control module 56 may fix the viewpoint 90 at the reference point of the group G2 while the event generation objects included in the group G2 generate events. Thus, the viewpoint 90 may be fixed at the reference point of each of the groups while the event generation objects included in the group generate events.

The viewpoint control module 56 according to an embodiment of the present invention can move the fixation point of the viewpoint 90 in synchronization with the viewpoint 90. To move the fixation point in synchronization with the viewpoint 90, the viewpoint control module 56 according to an embodiment of the present invention may determine the route of the fixation point by connecting the group fixation points in a predetermined order. In an embodiment of the present invention, the viewpoint control module 56 may fix the fixation point of the viewpoint 90 at the group fixation point (the centroid GC1) of the group G1 and, when the viewpoint 90 moves to the reference point of the group G2, the viewpoint control module 56 may move the fixation point to the group fixation point (the centroid GC2) of the group G2 in synchronization with the movement of the viewpoint 90. Thus, both the viewpoint 90 and the fixation point can be fixed while the event generation objects included in the group G1 generate events; therefore, the events generated by the event generation objects included in the group G1 can be represented with stable images.

The display control module 58 according to an embodiment of the present invention may display, in each turn, a view of the virtual space as seen from the viewpoint (e.g., the viewpoint 90) on a display device. The display device may include, for example, a display of the client terminal 30. For example, the display control module 58 according to an embodiment of the present invention may generate battle log information indicating the contents of battle processes performed in the modules and viewpoint information related to the viewpoint in the battle processes, and generate, in each turn, a view of the virtual space based on the battle log information and the viewpoint information. When the present invention is used for an application other than battle games, a view of a virtual space can be generated based not on the battle log information but on virtual space information indicating the events and actions of objects in the virtual space of the application.

The battle log information in an embodiment of the present invention may include data indicating various events representing the contents of the battle process in each turn and data indicating the results of the events, such as movement data indicating the positions of the objects after movement and the moving routes, attack event data indicating attack events by the objects, damage data indicating the magnitude of damage imparted on the objects in the attack events, and earned point data indicating the points such as experience points earned by the player objects. The battle log information in the present invention is not limited to that specifically described herein and may include various information indicating the contents of the battle process performed by the battle process module 42.

The viewpoint information in an embodiment of the present invention may include viewpoint position data indicating the positions of the viewpoint at some timings from the start of the battle process in the turn, fixation point data indicating the positions of the viewpoint at some timings from the start of the battle process in the turn, and field angle data indicating the field angles of the viewpoint at some timings from the start of the battle process in the turn. For example, the viewpoint data may be generated based on the data indicating the route of the viewpoint 90 and the route of the fixation point calculated by the route determination module 56.

For example, the display control module 58 according to an embodiment of the present invention can generate a view of the virtual space including images representing movement of the objects (movement images) based on the movement data of the objects and the viewpoint information during movement of the objects (information indicating the positions of the viewpoint, the positions of the fixation points, and the field angle). Also, the display control module 58 can generate a view of the virtual space including images representing attacks by the objects (attack event images) based on the attack event data of the objects, and the viewpoint information during the attack events.

The display control module 58 according to an embodiment of the present invention may send thus generated view of the virtual space to the client terminal 30 such that the view of the virtual space is displayed on the display of the client terminal 30. Further, the display control module 58 according to another embodiment of the present invention can send the battle log information and the viewpoint information to the client terminal 30.

In an embodiment of the present invention, the game module 61 of the client terminal 30 may display, on the display of the client terminal 30, the view of the virtual space received from the display control module 58 of the server 10. In another embodiment of the present invention, the game module 61 may generate a view of the virtual space based on the battle log information and the viewpoint information received from the display control module 58 of the server 10, and display thus generated view on the display. The game module 61 can display, on a display device, a view of the virtual space managed by the server 10 as seen from the viewpoint controlled as described above. Thus, the display control module 58 may send the generated view of the virtual space to the client terminal 30 or send the battle log information and the viewpoint information to the client terminal 30, such that the view of the virtual space may be displayed on the display of the client terminal 30.

Figure 9:
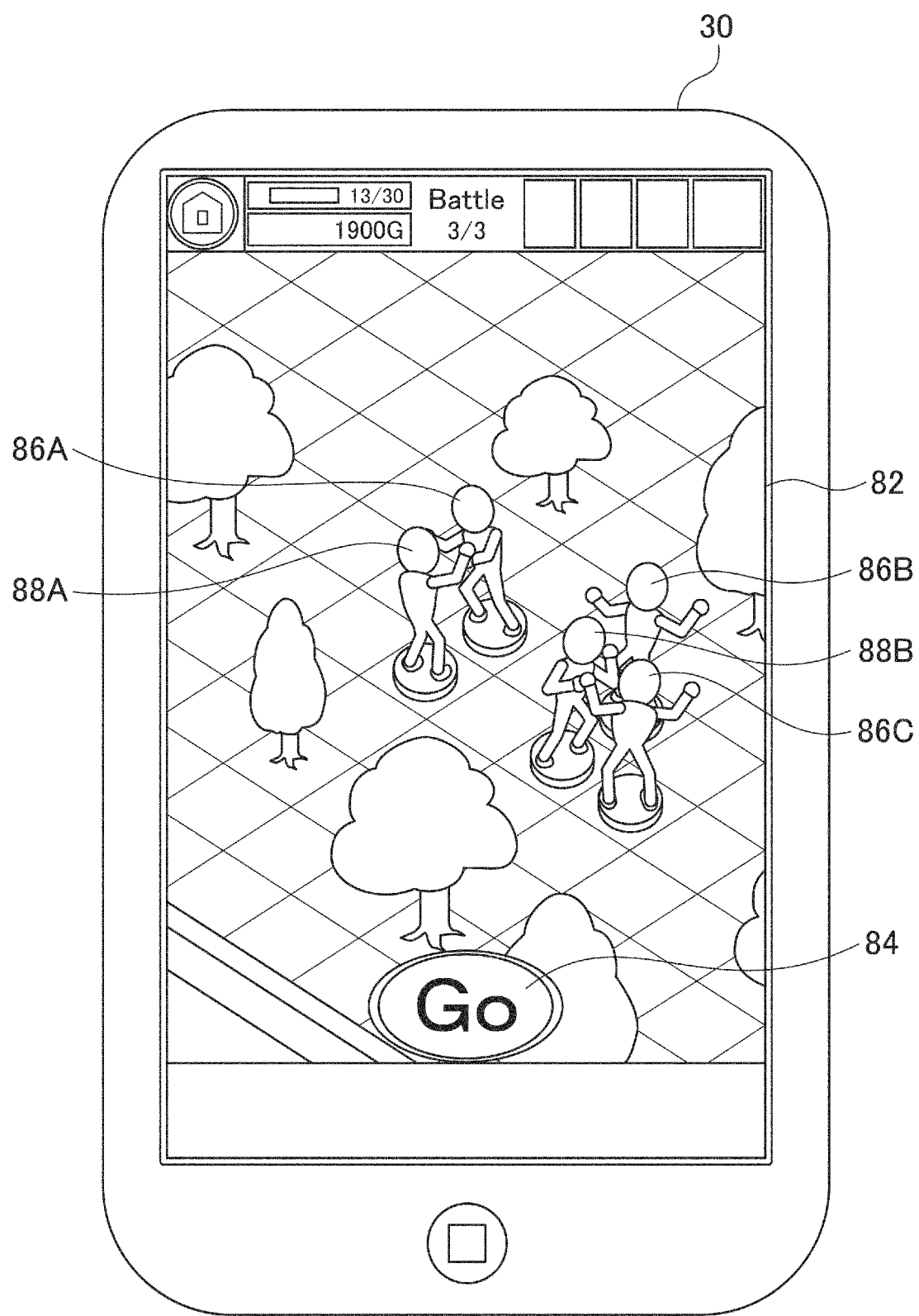
FIG. 9 shows an example of a view of a virtual space in an embodiment of the present invention.
Figure 10:
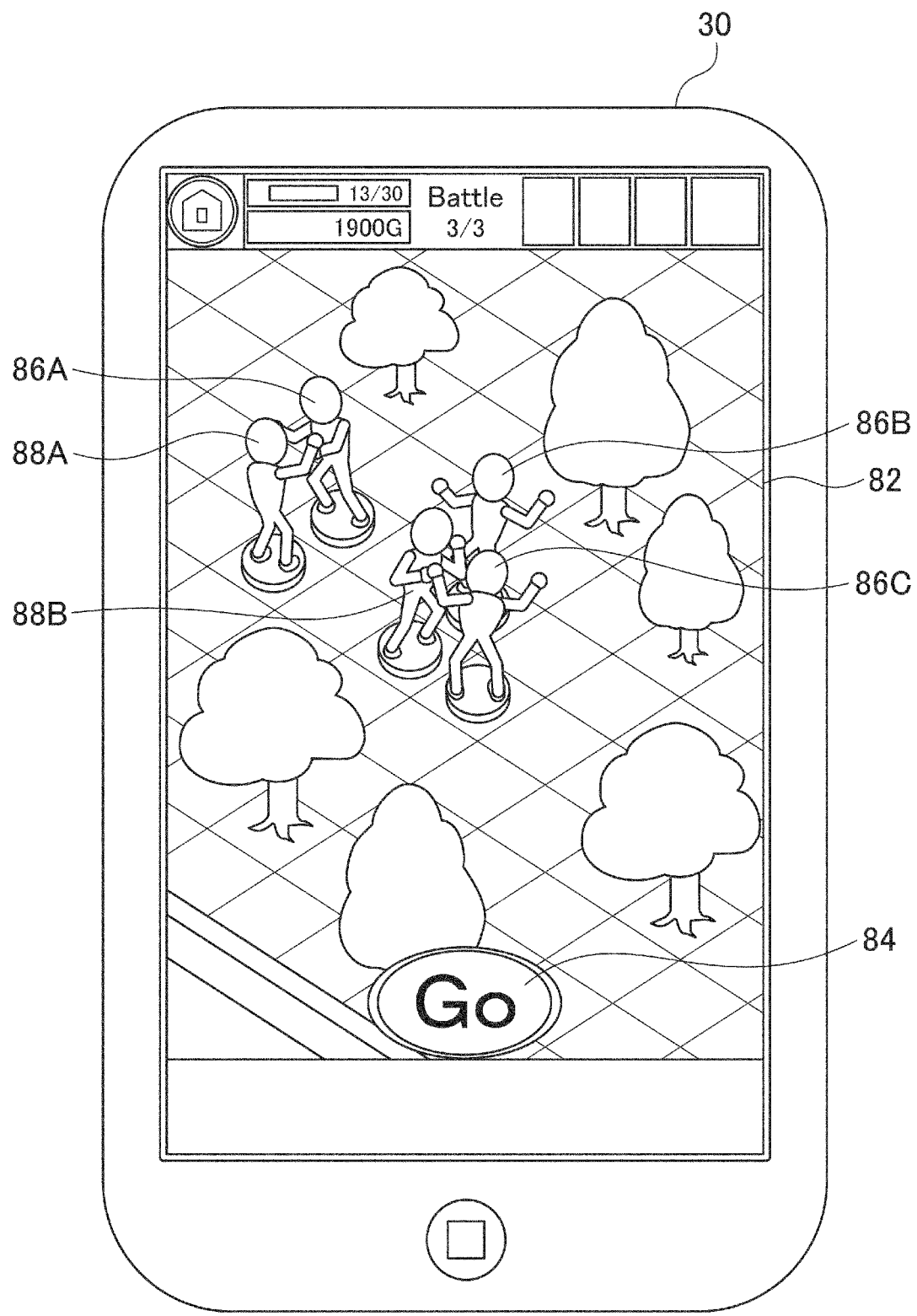
FIG. 10 shows an example of a view of a virtual space in an embodiment of the present invention.

FIGS. 9 and 10 show examples of a view of a virtual space in an embodiment of the present invention. FIG. 9 shows an example of a view of a virtual space shown in FIG. 7 wherein the fixation point at the group fixation point of the group G1 is seen from the viewpoint at the reference point R1; and FIG. 10 shows an example of a view of a virtual space shown in FIG. 7 wherein the fixation point at the group fixation point of the group G2 is seen from the viewpoint at the reference point R2. As in the embodiment shown in FIGS. 9 and 10, the view 82 of the virtual space of a battle game may be displayed on the touch screen of the client terminal 30. The view 82 of the virtual space may contain icons for using a menu screen and messaging functions of the game, and other various objects for the player to make input operations; these icons and objects are not shown in the drawings. As shown in FIGS. 9 and 10, the view wherein a fixation point at the group fixation point of a group is seen from the viewpoint at the reference point of the group may include all the objects included in the group. For example, when the virtual space contains a large number of objects, the viewpoint control module 56 may adjust the field angle (viewing angle) of the viewpoint 90 such that all the objects included in the group are included in the view.

The reception module 62 according to an embodiment of the present invention can receive instructions from the player to the player objects 86A to 86C. The player can make instructions to the player objects 86A to 86C by making a predetermined operation (e.g., tap, double tap, or drag) on the regions of the touch screen provided to the client terminal 30 where the player objects 86A to 86C are displayed. The instructions from the player to the player objects may include various instructions related to a battle with the non-player objects 88A and 88B, for example, movement to a particular square, attack on the non-player units 88A and 88D, and use of an item.

The messages indicating various instructions from the player received by the reception module 62 may be sent to the server 10 via the network 20 by the sending module 63 according to an embodiment of the present invention. As stated above, the server 10 may perform various processes based on the received messages in accordance with predetermined game logic.

Figure 11:
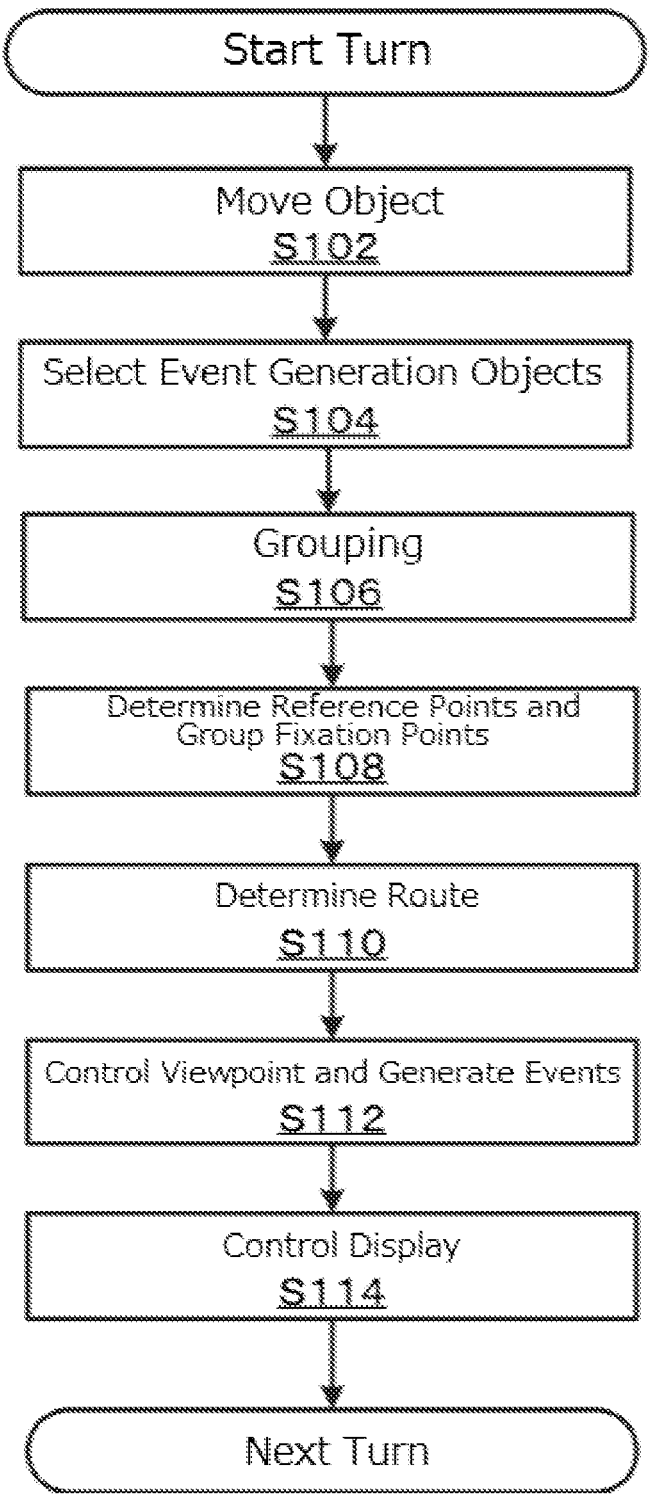
FIG. 11 is a flow diagram showing a process flow of displaying, on a display device, a view of a virtual space in a turn of a battle process in accordance with an embodiment of the present invention.

Referring next to FIG. 11, description will now be made on the flow of the process of generating a display screen of the virtual space in a turn of a battle process in accordance with an embodiment of the present invention. In step S102, the first to be performed when a turn is started in a battle game, each of a plurality of objects arranged in the virtual space (game space) may be moved to other positions in the virtual space in accordance with predetermined logic. Not all the objects in the virtual space need to be moved; objects to be moved may be moved to particular positions in accordance with predetermined logic. The movement of the objects may be controlled by, for example, the above-described movement control module 51.

Next, step S104 may be performed where one or more event generation objects satisfying a predetermined event generation condition may be selected from among a plurality of objects included in the virtual space. As described above, an example of the event may be an attack event on one object by another object. The selection of the event generation object may be performed by, for example, the above-described object selection module 52. For example, in the example shown in FIG. 2, all of the player objects 86A to 86C and the non-player objects 88A and 88B may be selected as event generation objects for performing an attack event on another object.

Next, step S106 may be performed where the plurality of objects in the virtual space may be grouped in a plurality of groups. For example, the grouping may be performed such that one or more event generation objects selected in step S104 may be in the same group as the objects for which the one or more event generation objects generate events. The grouping may be performed by, for example, the grouping module 53 described above.

Next, step S108 may be performed where a reference point and a group fixation point may be determined in the virtual space for each of the plurality of groups formed in step S106. For example, the position of the centroid of a plurality of objects included in a group may be selected as the group fixation point. The position of the reference point of a group may be determined based on the position of the group fixation point of the group. The positions of the reference point and the fixation point may be determined by, for example, the reference point determination module 54 described above.

Next, step S110 may be performed where the moving route of viewpoint may be determined based on the positions of the reference points determined in step S108. As described above, the moving route of the viewpoint may be determined by, for example, connecting the reference points of the groups in a predetermined order. The moving route may be determined by, for example, the route determination module 55 as described above.

Next, step S112 may be performed where the viewpoint is moved along the moving route determined in step S110, and events may be generated in accordance with the position of the viewpoint. In the example shown in FIG. 7, for example, when the viewpoint 90 is moved to the reference point R1 of the group G1, the event generation objects included in the group G1 (that is, the player object 86A and the non-player object 88A) may generate their own events. More specifically, the player object 86A may generate an attack event on the non-player object 88A, and the non-player object 88A may generate an attack event on the player object 86A. During both of the attack events of the player object 86A and the non-player object 88A, the viewpoint 90 may be fixed at the reference point R1, and the fixation point may be fixed at the group fixation point of the group G1 (corresponding to the centroid GC1).

After the events generated by the event generation objects included in the group G1 are terminated, the viewpoint 90 may be moved to the reference point R2 of the group G2. When the viewpoint 90 is moved to the reference point R2 of the group G2, the event generation objects included in the group G2 (that is, the player objects 86B and 86C and the non-player object 88B) may generate their own events. During the attack events of the event generation objects of the group G2, the viewpoint 90 may be fixed at the reference point R2, and the fixation point may be fixed at the group fixation point of the group G2 (corresponding to the centroid GC2). In step S112, the position and the field angle of the fixation point of the viewpoint may be determined at any time, in addition to the position of the viewpoint. For example, the viewpoint control module 56 described above may control the position and the field angle of the viewpoint and the fixation point; and the event generation module 57 described above may control the generation of events by the event generation objects.

Next, step S114 may be performed where a view of the virtual space as seen from the viewpoint moving in the virtual space may be generated based on the processing in steps S102 to S112 and other processing; and the generated view of the virtual space may be displayed on the display device. The display device may be, for example, a display of the client terminal 30 shown in FIG. 1. The view of the virtual space may include images representing movement of an object and images representing an attack by an object. For example, movement images representing movement of an object may be generated based on data related to the position of the object at start of a turn, movement data related to movement of the object determined in step S102, and viewpoint information indicating the position of the viewpoint, the position of the fixation point, and the field angle during movement of the object.

In step S114, the attack event images representing an attack event between objects may be generated. The attack event images may be generated based on attack event data indicating an attack event generated in step S112, and viewpoint information indicating the position of the viewpoint, the position of the fixation point, and the field angle determined in step S112. Thus, the view of the virtual space in a turn may include movement images representing movement of an object and attack event images representing an attack event by an object. The display device may first display the movement images generated as above representing movement of the object, and then display the attack event images representing an attack event between the objects. For example, the display control module 58 described above may thus control display of the view of the virtual space.

With further reference to FIGS. 7, 9, and 10, examples of views of the virtual space displayed on the display of the display device will now be described. As described above, in an embodiment, the viewpoint 90 may be fixed at the reference point R1 and the fixation point may be fixed at the group fixation point of the group G1 (corresponding to the centroid GC1) during the attack events of both the player object 86A and the non-player object 88A; therefore, events generated by the event generation objects included in the group G1 may be represented by the images as the player sees the fixation point fixed at the group fixation point of the group G1 from the viewpoint fixed at the reference point R1. FIG. 9 shows an image (attack event image) as the player sees the fixation point fixed at the group fixation point of the group G1 from the viewpoint fixed at the reference point R1. As shown, the attack event coordinates may be displayed such that the group fixation point GC1 of the group G1 (the centroid of the player object 86A and the non-player object 88A) is positioned at the substantial center of the display. Next, when the viewpoint moves to the reference point R2 of the groups G2, images as the player sees the fixation point fixed at the fixation point GC2 of the group G2 from the viewpoint fixed at the reference point R2 may be generated as attack event images corresponding to the group G2. As shown in FIG. 10, the attack event images corresponding to the group G2 may be displayed such that the group fixation point GC2 of the group G2 (the centroid of the player objects 86B and 86C and the non-player object 88B) is positioned at the substantial center of the display. Thus, in response to the movement of the viewpoint from the reference point R1 to the reference point R2, the view displayed on the display device may be changed from the image shown in FIG. 9 to the image shown in FIG. 10. The user watching the display device may feel like the virtual space has moved in the direction of lower right of the figures.

When the view of the virtual space in a turn is thus generated, the process of generating a view for the turn may be terminated, and the process of generating a view for the next turn may be started as necessary. In the embodiment shown in FIG. 11, grouping is performed after the turn is started; but it may also be possible that the grouping be performed before the turn is started (e.g., at start of the game or at a predetermined timing designated by the player), as described above. Also, it may be possible that the processes in the embodiment shown in FIG. 11 other than the grouping be performed before start of the turn as necessary.

In the view of the virtual space as described above, a reference point may be set for each of the plurality of groups including a plurality of objects in the virtual space; and the viewpoint may move to the reference points set for the individual groups in a predetermined order. Therefore, the viewpoint may move for a smaller number of times than in a conventional viewpoint control method wherein the viewpoint moves to each object position. Particularly, in an embodiment, event images representing events in a groups (e.g., attack event images) may be represented as images as the player sees the fixation point fixed at the group fixation point from the viewpoint fixed at the reference point of the group; therefore, the events generated by the objects included in the group can be seen in a stable images (with less movement of the viewpoint). The position of the fixation point may be fixed at a group fixation point set for the group. Accordingly, the view of the virtual space displayed in accordance with the embodiment can represent generation of events in the virtual space with a smaller number of movements of the viewpoint than conventional views wherein the viewpoint is moved to each of the objects generating events.

In the embodiments above, objects which are not event generation objects and are not subjected to the events generated by the event generation objects (hereinafter referred to as "no-action objects") may not be included in any of the group; therefore, the viewpoint may not be moved to the positions corresponding to the no-action objects. It should be noted that there is less necessity of moving the viewpoint such that the view may include the no-action objects independent of the events.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

LIST OF REFERENCE NUMBERS 10 server
11, 31 processor
15, 25, 35 storage
30 client terminal
41 game control module
42 battle process module
51 movement control module
52 object selection module
53 grouping module
54 reference point determination module 55 route determination module
56 viewpoint control module
57 event generation module
58 display control module
61 game module
62 reception module

What is claimed is:

1. A system for generating a view of a virtual space comprising:
one or more memories storing a computer program; and
one or more processors for executing the computer program stored on the one or more memories,
wherein the computer program comprises instructions for:
selecting a plurality of event generation objects from a plurality of objects placed in the virtual space, each of the plurality of event generation objects is configured to generate an event to interact with one or more other objects in the virtual space defined by a predetermined event generation condition;
grouping the plurality of objects placed in the virtual space into a plurality of groups;
determining a reference point and a group fixation point in the virtual space for each of the plurality of groups;
configuring positions of a viewpoint and a fixation point in the virtual space; and
displaying, on the display device, the view of the virtual space as viewed from the viewpoint toward the fixation point,
wherein each of the plurality of event generation objects are grouped in a same group with one or more other objects and each of the plurality of event generation objects interacts with one or more other objects within the same group, and
configuring the positions of the viewpoint and the fixation point in the virtual space further includes
determining whether at least one event generation object in a first group generates one or more first events; and
if it is determined that at least one event generation object in the first group generates one or more first events, configuring the viewpoint at the reference point of the first group and the fixation point at the group fixation point of the first group.

2. The system of claim 1 wherein the computer program further comprises instructions for:
generating one or more second events when the viewpoint is configured at the reference point of the first group and/or when the fixation point is configured at the group fixation point of the first group.

3. The system of claim 2 wherein the computer program further comprises instructions for:
generating the one or more first events and the one or more second events in an order determined based on a characteristic assigned to each of the one or more event generation objects included in the first group.

4. The system of claim 1 wherein the computer program further comprises instructions for:
setting the group fixation point of each of the plurality of groups at a centroid of the objects included in the each of the plurality of groups.

5. The system of claim 1 wherein the computer program further comprises instructions for:
determining whether all event generation objects in the first group have generated events; and
if it is determined that all event generation objects in the first group have generated events, configuring the viewpoint to the reference point of a second group different from the first group and the fixation point to the group fixation point of the second group.

6. The system of claim 1 wherein
the virtual space is a game space related to a battle game performing battles between the plurality of objects; and
the events are related to the battle game.

7. The system of claim 1, wherein the predetermined event generation condition includes a preset range within which the each of the plurality of event generation objections generates the event to interact with the one or more other objects.

8. A non-transitory computer-readable storage medium storing a computer program for causing a display device to display a view of a virtual space including a plurality of objects placed in the virtual space,
the computer program causing one or more computer processors to function as:
an object selection unit configured to select a plurality of event generation objects from a plurality of objects, each of the plurality of event generation objects is configured to generate an event to interact with one or more other objects in the virtual space defined by a predetermined event generation condition;
a grouping unit configured to group the plurality of objects placed in the virtual space into a plurality of groups;
a reference point determination unit configured to determine a reference point and a group fixation point in the virtual space for each of the plurality of groups;
a viewpoint control unit configured to configure positions of a viewpoint and a fixation point in the virtual space; and
a display control unit configured to display, on the display device, the view of the virtual space as viewed from the viewpoint toward the fixation point,
wherein the grouping unit is configured to group the plurality of objects such that each of the plurality of event generation objects are grouped in a same group with the one or more other objects and each of the plurality of event generation objects interacts with one or more other objects within the same group, and
the viewpoint control module is further configured to
determine whether at least one event generation object in a first group generates one or more first events; and
if it is determined that at least one event generation object in the first group generates one or more first events, configure the viewpoint at the reference point of the first group and the fixation point at the group fixation point of the first group.

9. A method using one or more processors for causing a display device to display a view of a virtual space including a plurality of objects placed in the virtual space, the method comprising the steps of:
selecting a plurality of event generation objects from the plurality of objects, each of the plurality of event generation objects is configured to generate an event to interact with one or more other objects in the virtual space defined by a predetermined event generation condition;
grouping the plurality of objects placed in the virtual space into a plurality of groups;
determining a reference point and a group fixation point in the virtual space for each of the plurality of groups;
configuring positions of a viewpoint and a fixation point in the virtual space by the one or more processors; and
displaying, on the display device, the view of the virtual space as viewed from the viewpoint toward the fixation point, wherein, in the step of grouping, the plurality of objects are grouped such that each of the plurality of event generation objects are grouped in a same group with the one or more other objects and each of the plurality of event generation objects interacts with one or more other objects within the same group, and the step of configuring the positions of the viewpoint and the fixation point in the virtual space further includes determining whether at least one event generation object in a first group generates one or more first events; and if it is determined that at least one event generation object in the first group generates one or more first events, configuring the viewpoint at the reference point of the first group and the fixation point at the group fixation point of the first group.

* * * * *